(12) United States Patent
Ikeda (10) Patent No.: US 7,986,808 B2
(45) Date of Patent: Jul. 26, 2011

(54) IMAGE-CAPTURING DEVICE, IMAGE-PROCESSING DEVICE, METHOD FOR CONTROLLING IMAGE-CAPTURING DEVICE, AND PROGRAM FOR CAUSING COMPUTER TO EXECUTE THE METHOD

(75) Inventor: Eiichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 11/238,454

(22) Filed: Sep. 29, 2005

(65) Prior Publication Data

US 2006/0077264 A1      Apr. 13, 2006

(30) Foreign Application Priority Data

Sep. 30, 2004 (JP) .................................. 2004-287653

(51) Int. Cl.
*G06K 9/00* (2006.01)
(52) U.S. Cl. ........ 382/103; 382/115; 382/118; 382/164; 348/169
(58) Field of Classification Search ............... 348/222.1, 348/229.1, 348, 333.02, 308, 345; 382/180, 382/103
See application file for complete search history.

(56) References Cited

U.S. PATENT DOCUMENTS

| | | | | |
|---|---|---|---|---|
| 5,606,392 A * | 2/1997 | Tintera et al. | .................. | 396/161 |
| 5,682,197 A * | 10/1997 | Moghadam et al. | ............ | 348/36 |
| 6,473,126 B1 * | 10/2002 | Higashihara et al. | ......... | 348/345 |
| 6,970,199 B2 * | 11/2005 | Venturino et al. | ........ | 348/333.02 |
| 7,095,443 B2 * | 8/2006 | Yoshikawa | ..................... | 348/350 |
| 7,268,817 B2 * | 9/2007 | Lee et al. | ........................ | 348/355 |
| 7,298,412 B2 * | 11/2007 | Sannoh et al. | ................ | 348/348 |
| 7,372,493 B2 * | 5/2008 | Panicacci | ....................... | 348/308 |
| 7,423,686 B2 * | 9/2008 | Yamashita | ..................... | 348/348 |
| 7,495,699 B2 * | 2/2009 | Nayar et al. | .................. | 348/239 |
| 7,514,660 B2 * | 4/2009 | Ikeda et al. | ................ | 250/201.2 |
| 7,551,223 B2 * | 6/2009 | Tanaka | .......................... | 348/346 |
| 7,573,505 B2 * | 8/2009 | Kawaguchi et al. | ....... | 348/222.1 |
| 7,590,290 B2 * | 9/2009 | Chan et al. | ..................... | 382/218 |
| 2003/0063213 A1 * | 4/2003 | Poplin | ........................... | 348/362 |
| 2003/0071908 A1 * | 4/2003 | Sannoh et al. | ................ | 348/345 |
| 2004/0022435 A1 * | 2/2004 | Ishida | .......................... | 382/190 |
| 2005/0275747 A1 * | 12/2005 | Nayar et al. | .................. | 348/362 |

FOREIGN PATENT DOCUMENTS

| | | |
|---|---|---|
| JP | 11-283036 A | 10/1999 |
| JP | 2000-090191 A | 3/2000 |
| JP | 2000-123186 A | 4/2000 |
| JP | 2002-158982 A | 5/2002 |
| JP | 2003-107335 A | 4/2003 |
| JP | 2003-271958 A | 9/2003 |
| JP | 2004-062565 A | 2/2004 |

(Continued)

*Primary Examiner* — Daniel G Mariam
*Assistant Examiner* — Nancy Bitar
(74) *Attorney, Agent, or Firm* — Canon U.S.A., Inc., IP Division (57) ABSTRACT

An image-processing device having a function that performs detection processing on a first image signal to detect a specific target region of a subject includes an image-signal generating unit that generates a second image signal different from the first image signal based on the first image signal, a target-region detecting unit that performs detection processing on the first and second image signals to detect the specific target region of the subject, and a control unit that selects the results of detecting the target region from either the first or second image signal.

12 Claims, 10 Drawing Sheets

FOREIGN PATENT DOCUMENTS

| | | | |
|---|---|---|---|
| JP | 2004-133637 | A | 4/2004 |
| JP | 2004-152127 | A | 5/2004 |
| JP | 2004-201228 | A | 7/2004 |
| JP | 2005-250773 | A1 | 9/2005 |
| WO | 03083773 | A2 | 10/2003 |

\* cited by examiner

(PRIOR ART)

FIG. 10

(PRIOR ART)

IMAGE-CAPTURING DEVICE, IMAGE-PROCESSING DEVICE, METHOD FOR CONTROLLING IMAGE-CAPTURING DEVICE, AND PROGRAM FOR CAUSING COMPUTER TO EXECUTE THE METHOD

BACKGROUND OF THE INVENTION

1. Field of the Invention

The present invention relates to image-capturing devices such as digital cameras and digital video cameras, image-processing devices, and methods for controlling the image-capturing devices. These image-capturing devices and image-processing devices have a function for detecting a predetermined region of a subject.

2. Description of the Related Art

In known image-capturing devices, techniques for automatically detecting a predetermined region of a shot image of a subject and performing various types of processing on the detected region have been proposed.

In Japanese Patent Laid-Open No. 2003-107335, a technique for performing automatic focusing (hereinafter called AF) on a detected face region of a subject and shooting an image is disclosed. A technique for performing automatic exposure (hereinafter called AE) based on luminance values of a detected face region to properly adjust the face region and shooting an image is also disclosed.

Figure 9:
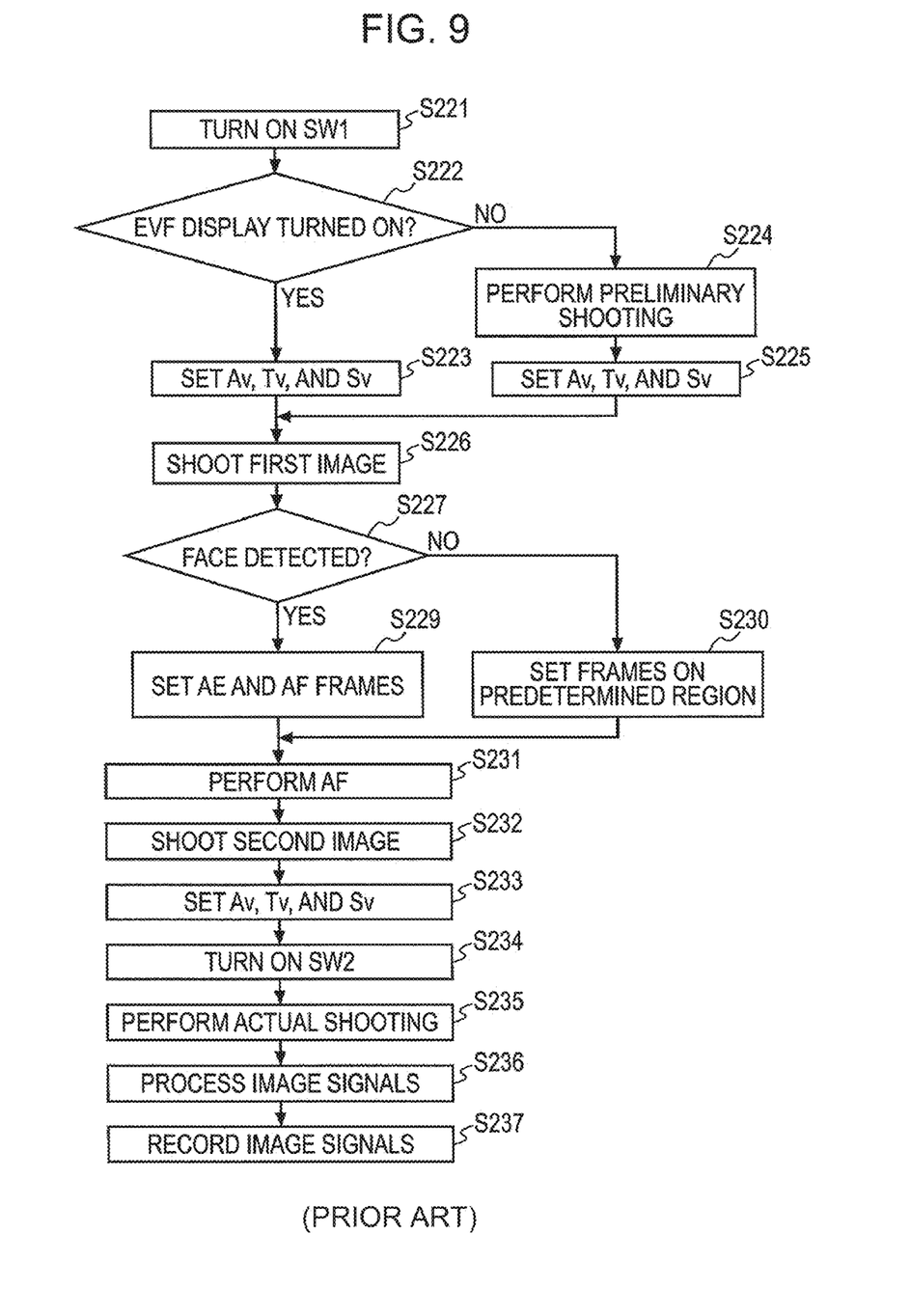
FIG. 9 is a flowchart showing a known process.

FIG. 9 is a flowchart showing a shooting operation of a known digital camera including a face-detecting module.

This digital camera performs optimal AF and AE on a face region detected by the face-detecting module.

In step S221, a CPU in the digital camera detects that a shooting person half-presses a shutter button, i.e., a switch SW1 is turned on. In step S222, the CPU determines whether an electric view finder (hereinafter called EVF) display is turned on. When the CPU determines that the EVF display is turned on, the process proceeds to step S223. When the CPU determines that the EVF display is turned off, the process proceeds to step S224.

When the EVF display is turned on, in step S223, an AE-control circuit sets a diaphragm value (hereinafter called Av), a shutter speed (hereinafter called Tv), and an analog gain (hereinafter called Sv) to obtain an image for detecting a face. These values, determined at the time when an image to be displayed on the EVF is obtained just before the switch SW1 is turned on, are used.

In a case where the EVF display is turned off, after the switch SW1 is turned on, in step S224, the AE-control circuit performs a preliminary shooting under preset exposure conditions: Av, Tv, and Sv.

In step S225, the AE-control circuit resets Av, Tv, and Sv to shoot an image for detecting a face based on image signals obtained by the preliminary shooting in step S224.

In step S226, the AE-control circuit shoots a first image with Av, Tv, and Sv, which are set in step S223 or S225.

In step S227, the CPU inputs signals of the first image obtained in step S226 to a face-detecting circuit to obtain data about a face, for example, coordinates of a face region and reliability of face detection. When a face region is detected in step S227, in step S229, the CPU sets a light metering frame and a focusing frame for the face region detected in step S227. On the other hand, when a face region is not detected in step S227, in step S230, the CPU outputs a message that face detection failed and sets a light metering frame and a focusing frame on a predetermined region.

In step S231, an AF-control circuit performs automatic focusing based on image signals within the focusing frame set in step S229 or S230.

In step S232, the CPU performs shooting of a second image to obtain exposure conditions for actual shooting as of the time when automatic focusing is completed.

In step S233, the AE-control circuit sets Av, Tv, and Sv for actual shooting by performing calculations so that the weighting of luminance values of the light metering frame is increased based on signals of the second image. The shooting person is notified that automatic exposure is completed by displaying the light metering frame on the EVF.

When the shooting person fully presses the shutter button, i.e., a switch SW2 is turned on, in step S234, in step S235, the CPU performs actual shooting with Av, Tv, and Sv set in step S233.

In step S236, the CPU extracts luminance signals, color signals, and the like from signals of the actual shot image. An image-conversion circuit converts these signals to general-purpose image signals, for example, image signals compressed in compliance with a JPEG compression format.

In step S237, the CPU records the image signals converted in step S236 on a recording medium.

Next, a typical algorithm of face detection in a general-purpose face-detecting module is briefly described.

Figure 11A:
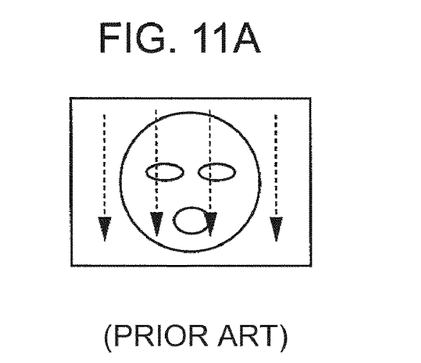
FIGS. 11A and 11B are views showing bandpass filtering.
Figure 11B:
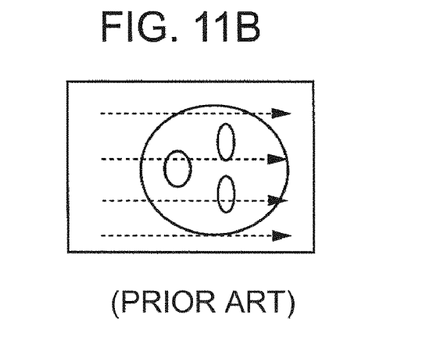

Bandpass filtering that lets through signals within a specific frequency band is first performed on image signals subjected to face detection, in the vertical direction as shown in FIG. 11A and in the horizontal direction as shown in FIG. 11B, to detect edge components in the image signals.

Then, pattern matching is performed on the detected edge components to extract image data of parts characterizing a face, for example, eyes, a nose, a mouth, and ears.

Among pieces of the extracted image data likely to correspond to eyes, those that satisfy predetermined conditions, for example, the distance between eyes and the inclination of each eye, are selected as a valid combination of pieces of image data likely to correspond to eyes.

The linkage between the selected valid combination of pieces of image data likely to correspond to eyes and the corresponding image data of parts forming a face, for example, a nose, a mouth, and ears, is established, and these pieces of image data are filtered with predetermined conditions for filtering out image data other than a face region to detect a face region.

These predetermined filtering conditions are compared with pieces of image data that are likely to correspond to a face region to determine that these pieces of image data are not those of a face region when this comparison does not satisfy a predetermined evaluation value.

Figure 10:
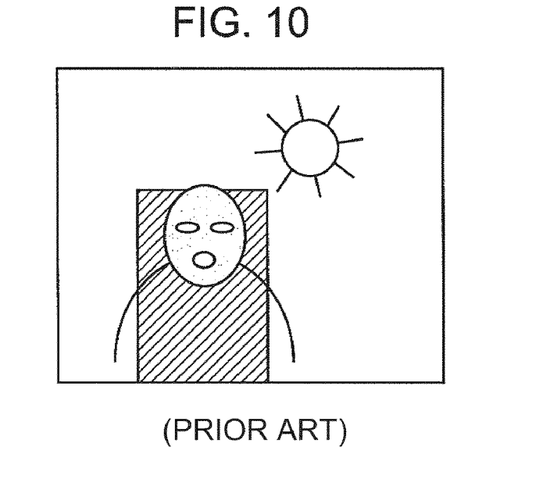
FIG. 10 is a view showing a back-lighted scene.

However, a known image-capturing device having a face-detecting function may occasionally fail to detect a face region, especially in a case of a back-lighted scene as shown in FIG. 10. This is because, even in a case where exposure is appropriate in view of overall image signals, exposure of a face region that should be a main subject may be insufficient or excessive depending on the size, the location, and the like of a face that is a subject.

Moreover, when the size of a detected face is much larger or smaller than a predetermined pattern used in pattern matching, the accuracy in detecting a face region may decrease. Thus, a face may not be detected.

Moreover, in a face-detecting module that detects a pair of eyes based on image signals subjected to face detection, bandpass filtering is performed in the horizontal and vertical directions. When the value of inclination of a face with respect to one direction of bandpass filtering does not fall in a range of ±15°, the accuracy of face detection may significantly decrease.

In the operation flow described above, when face detection fails in step S227, a message indicating the failure is displayed in step S230. Thus, the user may view the message and may retry face detection. Specifically, the switch SW1 needs to be first turned off, and be again turned on after a layout is changed in view of the luminance, the size, and the inclination of the subject.

In actual shooting, the period between the time of pushing the shutter of the image-capturing device and the time when an image is captured (hereinafter called a shutter time lag) should be short. However, when automatic detection of a main subject fails due to the reasons described above, detection of the main subject needs to be repeated, thereby extending the shutter time lag.

Accordingly, the accuracy of automatic detection of a main subject needs to be improved regardless of conditions of the main subject, for example, the size and the inclination of the main subject.

SUMMARY OF THE INVENTION

The present invention has been made in consideration of the above situation, and improves the accuracy of face detection by performing image processing on image signals subjected to the face detection to obtain different image signals and then performing face detection on the obtained different image signals.

An image-processing device having a function that performs detection processing on a first image signal to detect a specific target region of a subject, according to the present invention, includes an image-signal generating unit that generates a second image signal different from the first image signal based on the first image signal, a target-region detecting unit that performs detection processing on the first and second image signals to detect the specific target region of the subject, and a control unit that selects the results of detecting the target region from either the first or second image signal.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail in accordance with the accompanying drawings.

First Embodiment

Figure 1:
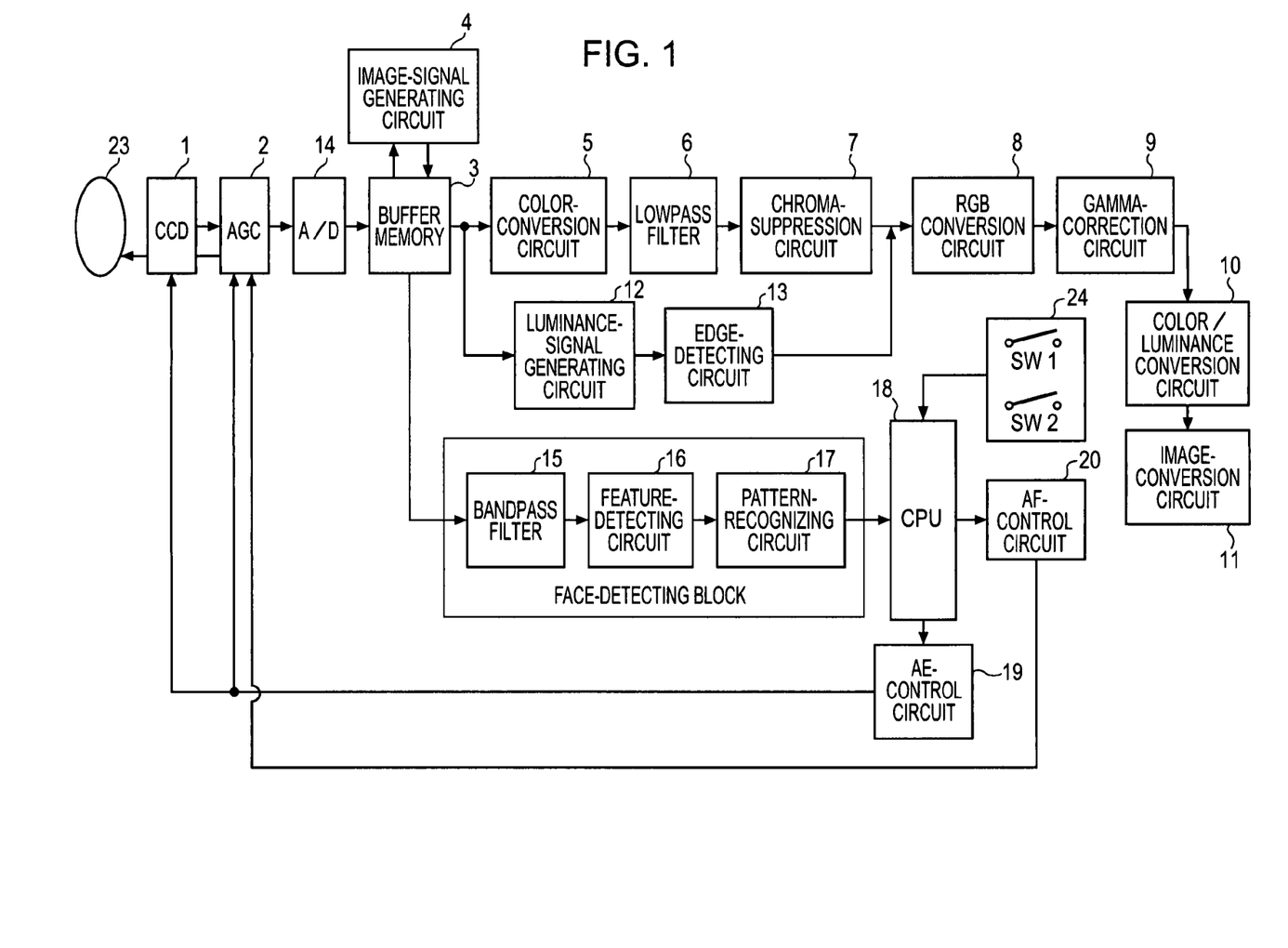
FIG. 1 is a block diagram of an image-capturing device according to a first embodiment.

FIG. 1 shows the structure of an image-capturing device according to a first embodiment of the present invention.

The image-capturing device includes a CCD 1 that has a photoelectric conversion function and that serves as a solid-state image sensing device, an automatic gain control (AGC) circuit 2 that controls an analog gain on the output of the CCD 1, an analog-to-digital converter (hereinafter AD converter) 14 that converts output signals from the AGC circuit 2 to digital image signals, and an optical element 23 that forms an image of a subject on the CCD 1. The solid-state image sensing device is not limited to a CCD, and may be another type of component that has a photoelectric conversion function, for example, a CMOS.

The image-capturing device further includes a buffer memory 3 that stores the output from the AD converter 14 and an image-signal generating circuit 4 that generates image signals different from those stored in the buffer memory 3 by applying a predetermined digital gain to the image signals stored in the buffer memory 3, i.e., by performing luminance level correction and gamma adjustment. The AGC 2 and AD converter 14 can be considered to be an image-conversion unit that converts an output signal from an image sensing device (CCD 1) to a first image signal, with the image signal generating circuit 4 generating a second image signal different from the first image signal based on the first image signal.

The image-capturing device further includes a color-conversion circuit 5 that obtains UV signals (color-difference signals) from the signals stored in the buffer memory 3 and a lowpass filter 6 that restricts the band of the output signals from the color-conversion circuit 5.

The image-capturing device further includes a chroma-suppression circuit 7 that suppresses a color-difference gain in a color saturation area corresponding to the signals filtered by the lowpass filter 6.

The image-capturing device further includes a luminance-signal generating circuit 12 that obtains Y signals (luminance signals) from the signals stored in the buffer memory 3 and an edge-detecting circuit 13 that detects edge components in the output from the luminance-signal generating circuit 12.

The image-capturing device further includes an RGB conversion circuit 8 that converts the UV signals, which are the output signals from the chroma-suppression circuit 7, and the Y signals, which are the output signals from the edge-detecting circuit 13, to RGB signals, and includes a gamma-correction circuit 9 that performs gamma correction on the output signals from the RGB conversion circuit 8.

The image-capturing device further includes a color/luminance conversion circuit 10 that converts the output signals from the gamma-correction circuit 9 to YUV signals and an image-conversion circuit 11 that converts the output signals from the color/luminance conversion circuit 10 to general-purpose image signals, for example, image signals compressed in compliance with a JPEG compression format.

The image-capturing device further includes a bandpass filter 15 that detects textures based on frequency characteristics of image signals and a feature-detecting circuit 16 that detects predetermined shapes of a subject based on the textures detected by the bandpass filter 15. In this embodiment, the feature-detecting circuit 16 detects images likely to correspond to parts characterizing a face, for example, eyes, a nose, a mouth, and ears. The image-capturing device further includes a pattern-recognizing circuit 17 that establishes the linkage between a detected image likely to correspond to an eye part and detected images likely to correspond to other main parts forming a face.

In this embodiment, the bandpass filter 15, the feature-detecting circuit 16, and the pattern-recognizing circuit 17 constitute a face-detecting block for detecting the face of a person. However, an object of detection is not necessarily the face of a person. An animal, a plant, a vehicle, a building, and the like can be detected instead of a face so long as the object can be identified by its shape. The face-detecting block is an example of a target-region detecting unit that performs detection processing on image signals to detect a specific target of a subject.

The image-capturing device further includes a CPU 18 that calculates parameters required for controlling a camera based on the output from the pattern-recognizing circuit 17. For example, automatic exposure control and/or automatic focusing control may be controlled depending on the results of detecting the target region.

The pattern-recognizing circuit 17 may use filtering conditions for filtering out objects based on, for example, the size of each eye, the distance between eyes, and the color of skin, these objects having elements that are not considered to be those of a face.

The image-capturing device further includes an AE-control circuit 19. The AE-control circuit 19 performs AE control based on the output from the CPU 18, determines Tv, Av, and Sv based on the output image signals, and controls a diaphragm unit (not shown), a drive unit of the CCD 1, and the AGC circuit 2. The image-capturing device further includes an AF-control circuit 20 that performs AF control based on the output from the CPU 18 and that determines a stop position of a focus lens included in the optical element 23.

The image-capturing device further includes an operation unit 24 including a switch SW1 that is turned on when a shutter button is half-pressed and a switch SW2 that is turned on when the shutter button is fully pressed.

Next, the shooting operation of the image-capturing device according to the first embodiment will be described in accordance with a flowchart of FIG. 2.

When the shutter button is half-pressed by a shooting person in step S101, i.e., the switch SW1 is turned on, in step S102, the AE-control circuit 19 sets Av, Tv, and Sv calculated based on exposure conditions at the time of shooting an EVF image just before the switch SW1 is turned on.

In step S103, the AE-control circuit 19 controls the diaphragm unit (not shown), the drive unit of the CCD 1, and the AGC circuit 2 based on Av, Tv, and Sv, which are set, to shoot a first image and to temporarily store first image signals of the first image in the buffer memory 3.

In step S104, the image-signal generating circuit 4 sets a digital gain, as described below.

In step S105, the image-signal generating circuit 4 applies the digital gain set in step S104 to the first image signals obtained in step S103 to obtain second and third image signals having luminance levels different from that of the first image signals.

In step S106, the face-detecting block, including the bandpass filter 15, the feature-detecting circuit 16, and the pattern-recognizing circuit 17, seeks to detect a face region based on the first to third image signals.

A typical method for detecting a face region according to this embodiment is the same as a known method. In this method, images likely to correspond to parts characterizing a face, for example, eyes, a nose, a mouth, and ears, are detected by feature point extraction. Based on the results of the detection, an image of the face region is extracted by pattern matching and filtering with predetermined conditions. However, the method for detecting a face region is not limited to this method, and other methods, such as those disclosed in Japanese Patent Laid-Open Nos. 11-283036 and 2003-271958, may be adopted.

When a face region is detected in step S106, in step S107, the CPU 18 sets a light metering frame and a focusing frame for the detected face region, these frames being subjected to automatic exposure and focusing.

When a face region is detected only in one of the first to third image signals, the CPU 18 sets a light metering frame and a focusing frame based on the results of face-region detection obtained from these corresponding image signals.

When a face region is detected in more than one of the first to third image signals, the CPU 18 sets a light metering frame and a focusing frame on the largest detected face region.

Alternatively, the CPU 18 may set a light metering frame and a focusing frame on the face region, in which the reliability of the results of face-region detection is highest.

In step S108, the AF-control circuit 20 drives the optical element 23 to perform automatic focusing so that an image, within the focusing frame set in step S107, is in focus.

In step S109, a fourth image is shot to obtain precise exposure values for actual shooting after the position of the optical element 23 is determined in step S108.

In step S110, the AE-control circuit 19 determines Av, Tv, and Sv for actual shooting by performing calculations so that the weighting of luminance values of signals within the light metering frame of the fourth image shot in step S109 is increased.

When a face region is not detected or the reliability of the detected face region is less than a predetermined threshold value in step S106, the process proceeds to step S115. In step S115, the CPU 18 outputs a message that face-region detection failed, and the AE-control circuit 19 performs regular evaluative light metering on the second image signals, the regular evaluative light metering being a light metering in which a face region is not considered. Specifically, the weighting of a central region of an image may be increased, and luminance values of the entire image may be determined. Alternatively, the weighting of a region of a nearby subject may be increased, and luminance values of the entire image may be determined. The light metering method is not limited to the evaluative light metering.

In step S116, the AE-control circuit 19 determines Av, Tv, and Sv for actual shooting based on values obtained in the evaluative light metering in step S115, and the process proceeds to step S111.

When the shutter button is fully pressed by the shooting person in step S111, i.e., the switch SW2 is turned on, in step S112, the AE-control circuit 19 controls the diaphragm unit, the drive unit of the CCD 1, and the AGC circuit 2 to perform actual shooting based on Av, Tv, and Sv set in step S110 or S116.

In step S113, the obtained signals are converted to image signals by the AD converter 14, are sent to signal-processing circuits such as the color-conversion circuit 5, and are finally converted to general-purpose image signals, for example, image signals compressed in compliance with a JPEG compression format, by the image-conversion circuit 11.

In step S114, the CPU 18 records the compressed image signals obtained in step S113 on a recording medium.

The processes in steps S103 and S105 will now be described in detail. FIG. 3 shows characteristics of output signals based on the optical input of the CCD 1.

In the image-capturing device according to the first embodiment, filtering of image signals subjected to face detection is performed as processing before face detection by the bandpass filter 15 to detect image signals likely to correspond to features of a face, for example, eyes, a nose, a mouth, and ears.

When a face region is excessively dark or bright, the rate of detecting features of a face by the bandpass filter 15 significantly decreases and thus the accuracy in detecting a face region decreases.

Accordingly, in step S103, the first image is shot under the control of the AE-control circuit 19 so that the luminance level of the first image is adjusted to, for example, a level (−1 Ev) that is one level lower than an appropriate luminance level, i.e., a target luminance level.

In step S105, the image-signal generating circuit 4 generates the second image signals having the appropriate luminance level (±0 Ev) by digitally amplifying the first image signals by an amplification factor of 2. Simultaneously, the image-signal generating circuit 4 generates the third image signals having a luminance level (+1 Ev) that is one level higher than the appropriate luminance level by digitally amplifying the first image signals by an amplification factor of 4.

As described above, a plurality of segments of image signals having different luminance levels are obtained by digitally amplifying the image signals of the same frame by different amplification factors. Thus, face-region detection can be performed on a plurality of segments of image signals having different luminance levels.

As described above, in this embodiment, since two segments of image signals having different luminance levels are generated from one segment of image signals, the probability of obtaining an image having a luminance level suitable for detecting a face region increases. Thus, the decrease in the accuracy of face detection due to the state of a scene to be shot, for example, a back-lighted scene, can be reduced.

In this embodiment, three segments of image signals having luminance levels of −1 Ev, ±0 Ev, and +1 Ev are generated. Alternatively, three segments of image signals having luminance levels of −2 Ev, ±0 Ev, and +2 Ev may be generated. Alternatively still, five or seven segments of image signals having different luminance levels may be generated. Other numbers of segments are possible.

In this embodiment, the first image is shot with a luminance level that is one level lower than a luminance level used in the previous shooting because it tends to be difficult due to the characteristics of a digital camera to recognize shapes based on image signals having an excessive luminance level, as compared with image signals having an insufficient luminance level.

Moreover, the first image signals may have the appropriate luminance level, and image signals having an insufficient luminance level and image signals having an excessive luminance level may be generated based on the first image signals.

Moreover, in this embodiment, the results of face-region detection are used in both automatic exposure and automatic focusing. Alternatively, the results may be used in either automatic exposure or automatic focusing.

Second Embodiment

The operation according to a second embodiment will be described in accordance with a flowchart of FIG. 4. The same reference numerals as in FIG. 2 are assigned to corresponding steps in FIG. 4.

In the first embodiment, a plurality of segments of image signals having different luminance levels are generated at one time, and face-region detection is performed on all of these segments of image signals. In contrast, in the second embodiment, the process is completed when a face region is detected from any segment of image signals.

Figure 2:
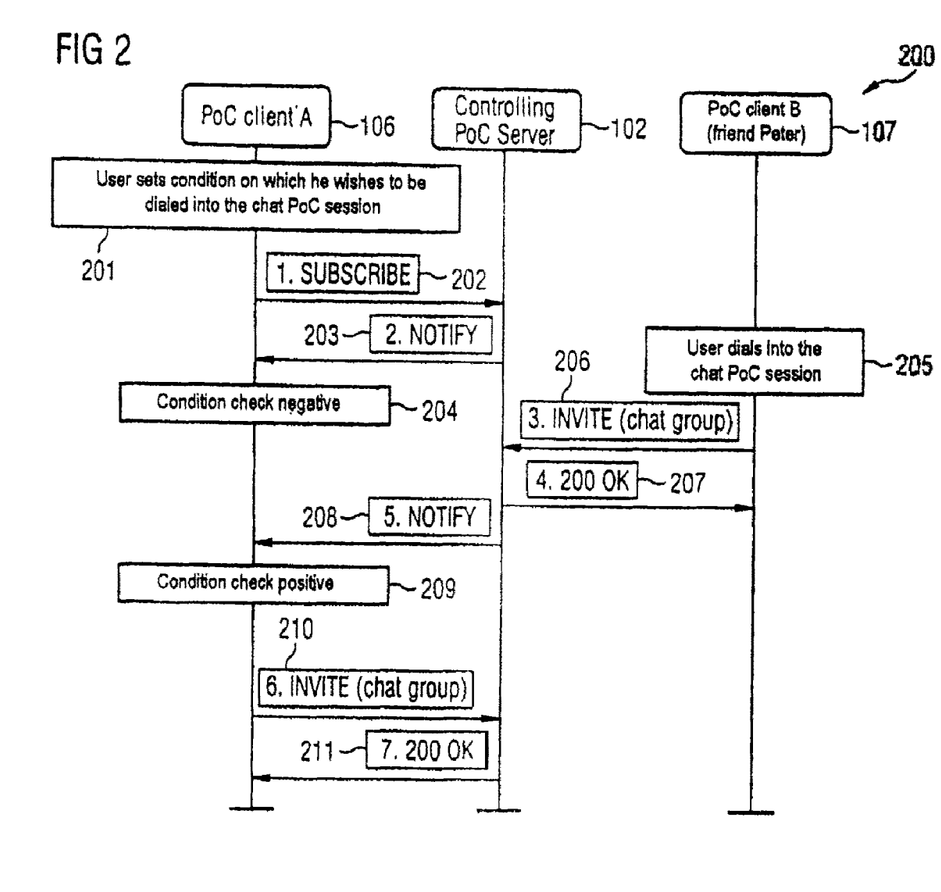
FIG. 2 is a flowchart showing the process according to the first embodiment.
Figure 3:
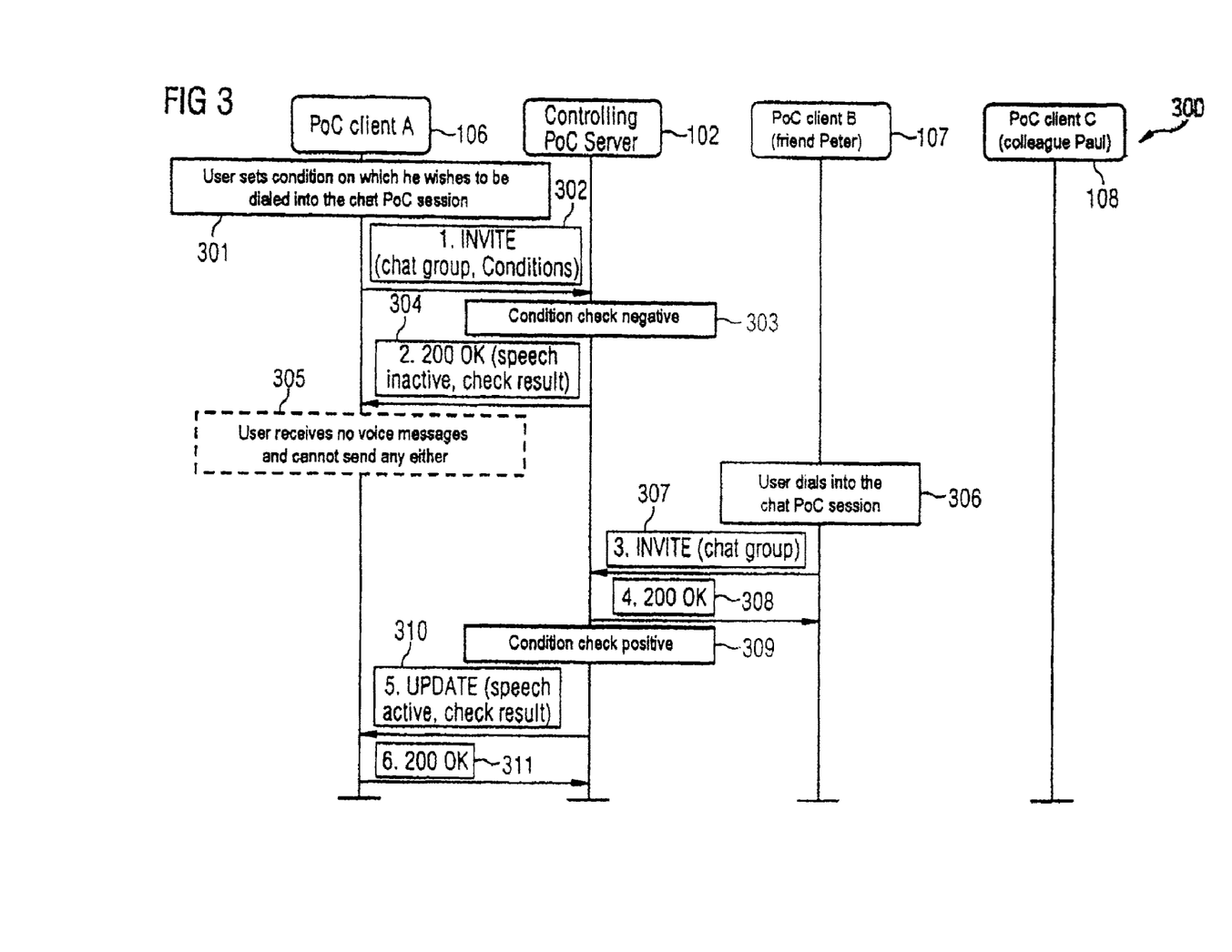
FIG. 3 is a view showing dynamic range expansion.
Figure 4:
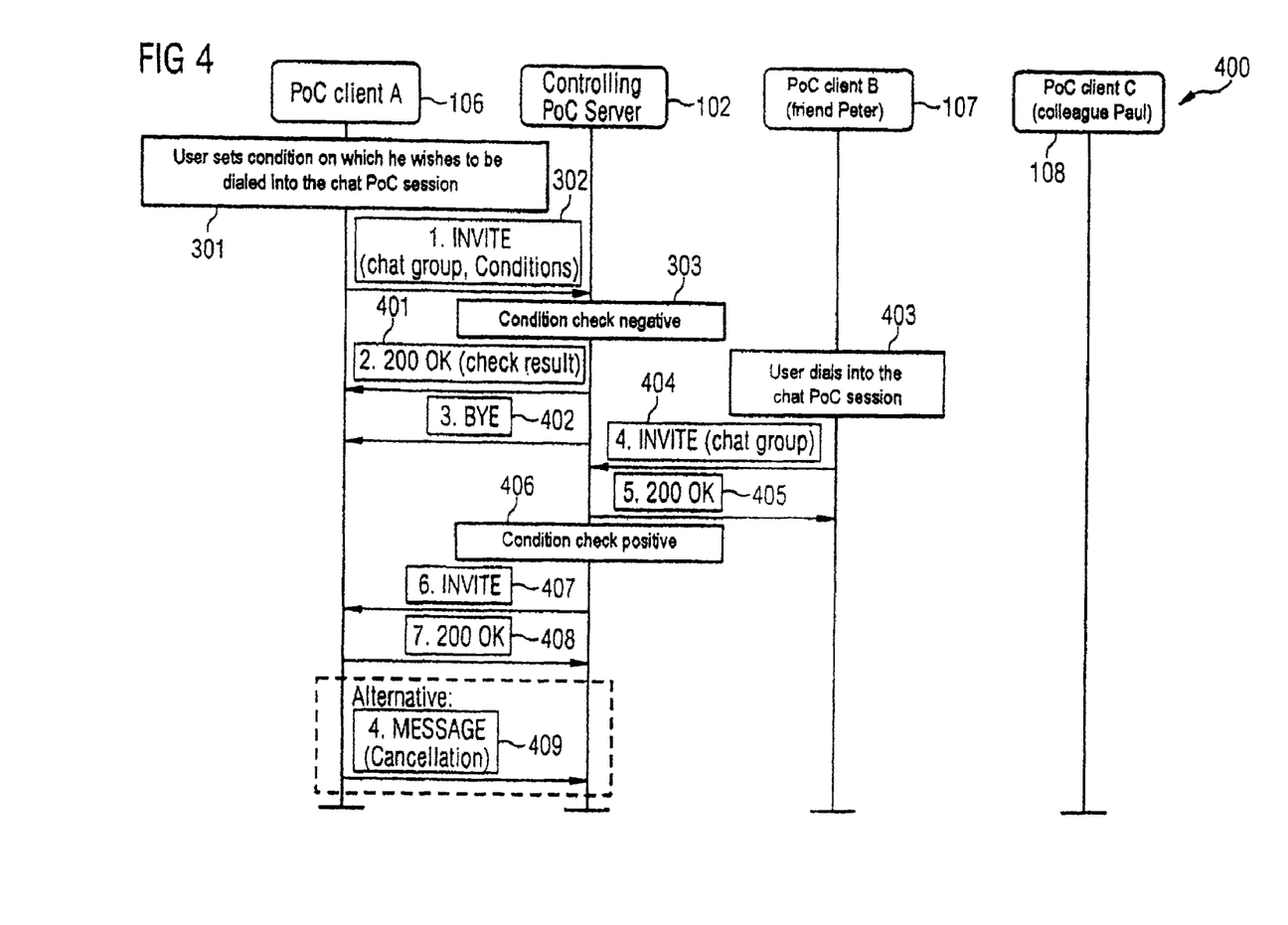
FIG. 4 is a flowchart showing the process according to a second embodiment.

The process flow through steps S101 to S103 and the process flow through steps S107 to S114 in FIG. 4 are the same as those in FIG. 2, and other process flows are unique to FIG. 4. The other process flows will be described.

In step S121, face-region detection is performed on the first image signals as in step S106 in FIG. 2.

When a face region is detected in step S121, the process proceeds to step S107.

When a face region is not detected or the reliability of the detected face region is less than a predetermined threshold value in step S121, the process proceeds to step S122.

In step S122, the image-signal generating circuit 4 sets a digital gain.

In step S123, the image-signal generating circuit 4 applies the digital gain to the first image signals to obtain the second image signals having a luminance level that is one level higher than the luminance level of the first image signals. Thus, the image signal generating circuit 4 generates a second image signal different from the first image signal based on the first image signal when a target-region detecting unit fails to detect the target region from the first image signal.

In step S124, face-region detection is performed on the second image signals as in step S106 in FIG. 2. When a face region is detected, the process proceeds to step S107.

When a face region is not detected or the reliability of the detected face region is less than the predetermined threshold value in step S124, the process proceeds to step S125.

In step S125, the image-signal generating circuit 4 sets a digital gain.

In step S126, the image-signal generating circuit 4 applies the digital gain to the first image signals as in step S123 to obtain the third image signals having a luminance level that is two levels higher than the luminance level of the first image signals.

In step S127, face-region detection is performed on the third image signals. When a face region is detected, the process proceeds to step S107.

When a face region is not detected or the reliability of the detected face region is less than the predetermined threshold value in step S127, the process proceeds to step S128.

In step S128, the CPU 18 outputs a message that face-region detection failed, the AE-control circuit 19 performs regular evaluative light metering on the second image signals as in step S115 in FIG. 2, and then the process proceeds to step S129. In step S129, Av, Tv, and Sv for actual shooting are determined, and the process proceeds to step S111.

As described above, when a face region is detected from the first image signals, the time required for face-region detection in the second embodiment is about a third of that in the first embodiment.

Even when a face region is detected from the second image signals, the time required for face-region detection in the second embodiment is shorter than that in a case where face-region detection is performed on three segments of image signals.

Third Embodiment

The operation according to a third embodiment will be described in accordance with a flowchart of FIG. 6. The same reference numerals as in FIG. 2 are assigned to corresponding steps in FIG. 6.

Figure 5:
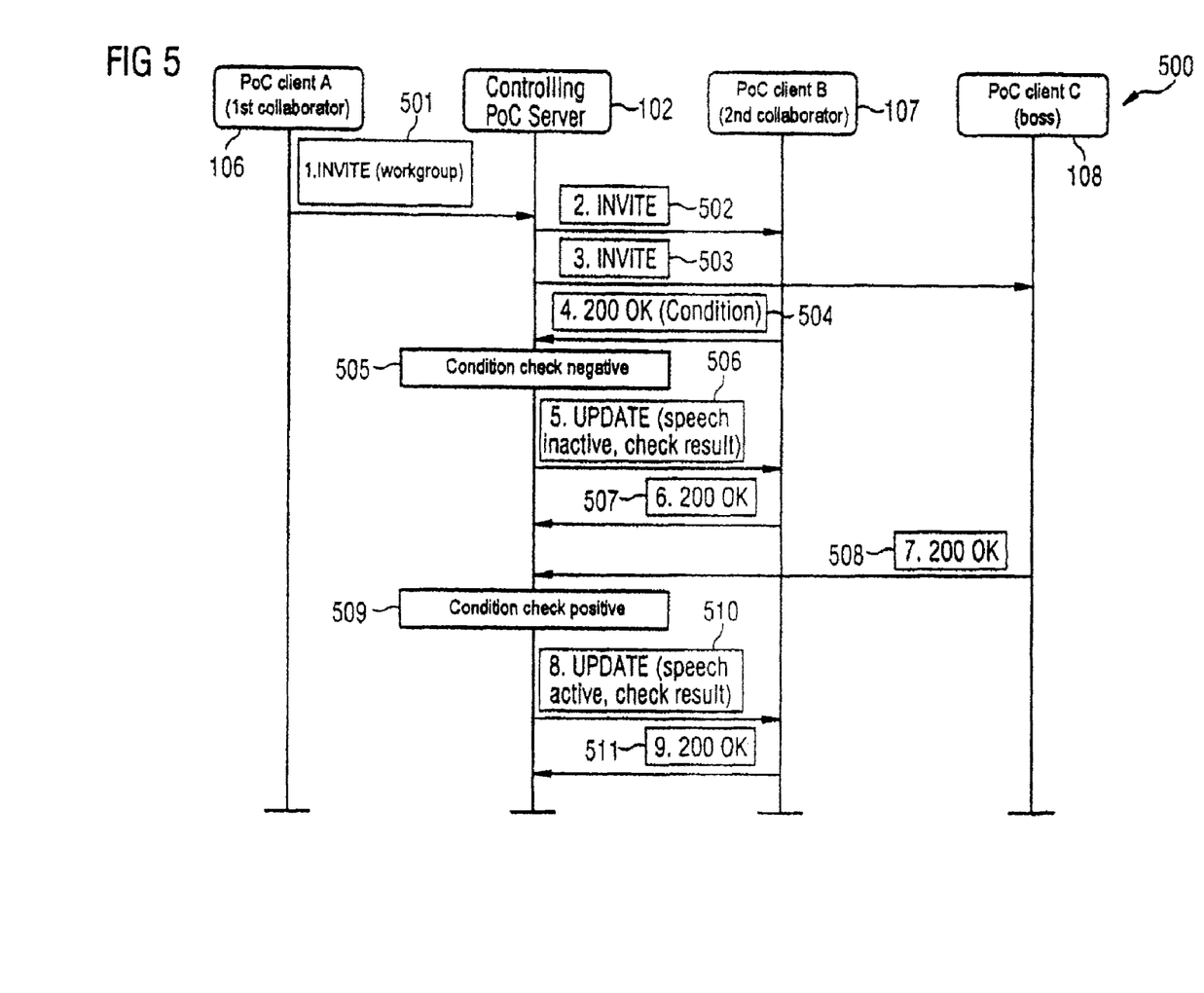
FIG. 5 is a block diagram of an image-capturing device according to a third embodiment.

FIG. 5 shows the structure of an image-capturing device according to the third embodiment. The structure of the image-capturing device shown in FIG. 5 is different from that shown in FIG. 1 in that the image-capturing device shown in FIG. 5 includes a pixel-interpolating circuit 21 instead of the image-signal generating circuit 4. The pixel-interpolating circuit 21 enlarges a detected face region.

The third embodiment is different from the first and second embodiments in that the accuracy of face detection is increased by detecting a face region from image signals of an image enlarged by the pixel-interpolating circuit 21 based on image signals of an image that is shot under predetermined exposure conditions in the third embodiment. The AGC 2 and AD converter 14 can be considered to be an image-conversion unit that converts an output signal from an image sensing device (CCD 1) to a first image signal, with the pixel-interpolating circuit 21 generating a second image signal, wherein a resolution of the first image signal is different to the resolution of the second image signal.

Figure 6:
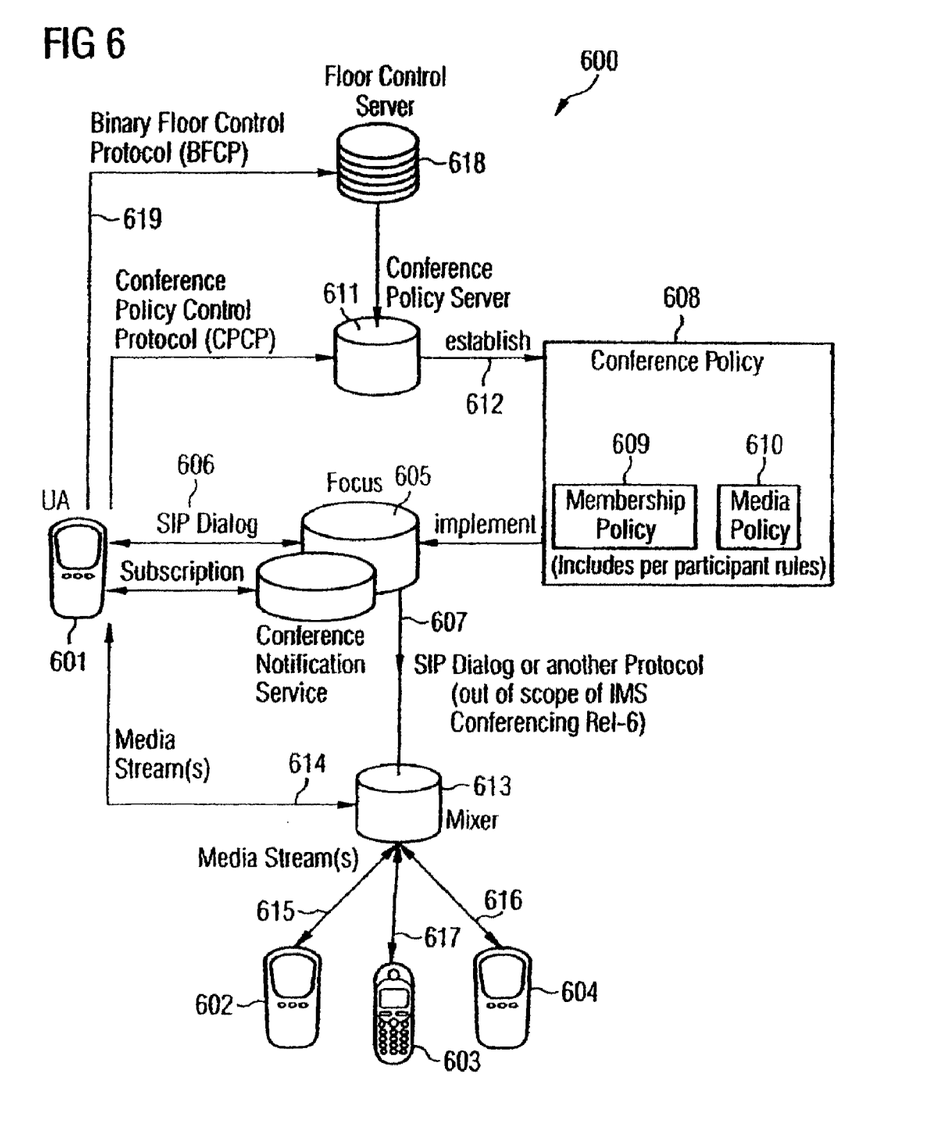
FIG. 6 is a flowchart showing the process according to the third embodiment.

The process flow through steps S101 to S103 and the process flow through steps S107 to S114 in FIG. 6 are the same as those in FIG. 2, and other process flows are unique to FIG. 6. The other process flows will be described.

When the first image signals are obtained in step S103, face-region detection is performed on the first image signals in step S131 as in step S106 in FIG. 2.

When a face region is detected in step S131, the process proceeds to step S107.

When a face region is not detected or the reliability of the detected face region is less than a predetermined threshold value in step S131, the process proceeds to step S132.

In step S132, the pixel-interpolating circuit 21 enlarges the image.

In step S133, face-region detection is performed on the image enlarged in step S132 as in step S106 in FIG. 2.

When a face region is detected in step S133, the process proceeds to step S107.

When a face region is not detected or the reliability of the detected face region is less than the predetermined threshold value in step S133, the process proceeds to step S134.

In step S134, the CPU 18 outputs a message that face-region detection failed, the AE-control circuit 19 performs regular evaluative light metering on the image signals before interpolation as in step S115 in FIG. 2, and then the process proceeds to step S135. In step S135, Av, Tv, and Sv for actual shooting are determined, and the process proceeds to step S111.

The process of enlarging an image by the pixel-interpolating circuit 21 in step S132 will now be described.

In this embodiment, face detection is performed on image signals of an image (for example, an image of about 320-by-240 pixels) generated by thinning out an original image to display the thinned-out image on the EVF included in the image-capturing device.

However, when the size of a frame for face-region detection is small (for example, about 10-by-10 pixels), the number of objects to be detected exponentially increases. Thus, the processing time is fairly long.

Conversely, when a detection frame is too large (for example, a frame of about 120-by-120 pixels), detection of a face region that is smaller than the detection frame fails.

In view of these problems, in this embodiment, the size of a detection frame (about 80-by-80 pixels) is large in relation to the size of the EVF, and the pixel-interpolating circuit 21 enlarges the image to be displayed on the EVF, which is stored in the camera as data. Then, a face region is detected from image signals of the enlarged image. Alternatively, a face region may be detected directly from the original shot image, which is not thinned out.

Under these circumstances, in order to improve processing speed, an image subjected to face-region detection is divided into a plurality of segments, and these segments are prioritized based on the results of light metering and face detection is performed on the segments according to priority. In this way, the time required for face-region detection can be shortened.

As described above, in this embodiment, even when a face region is not detected because the face region is small, the rate of detecting the face region can be increased by enlarging an image subjected to face-region detection. The number of images subjected to face detection may be increased by adjusting the scaling factor of the image.

Moreover, before the face-detecting block performs face detection on the first image signals, the pixel-interpolating circuit 21 may generate an enlarged image. Then, face detection may be performed on the first image signals and image signals of the enlarged image, and the results from the first image signals may be compared with the results from the image signals of the enlarged image. As in the first embodiment, when respective face regions are detected from a plurality of segments of image signals, the CPU 18 may set a light metering frame and a focusing frame on a face region in which the reliability of the results of face-region detection is highest.

Fourth Embodiment

The operation according to a fourth embodiment will be described in accordance with a flowchart of FIG. 8. The same reference numerals as in FIG. 2 are assigned to corresponding steps in FIG. 8.

Figure 7:
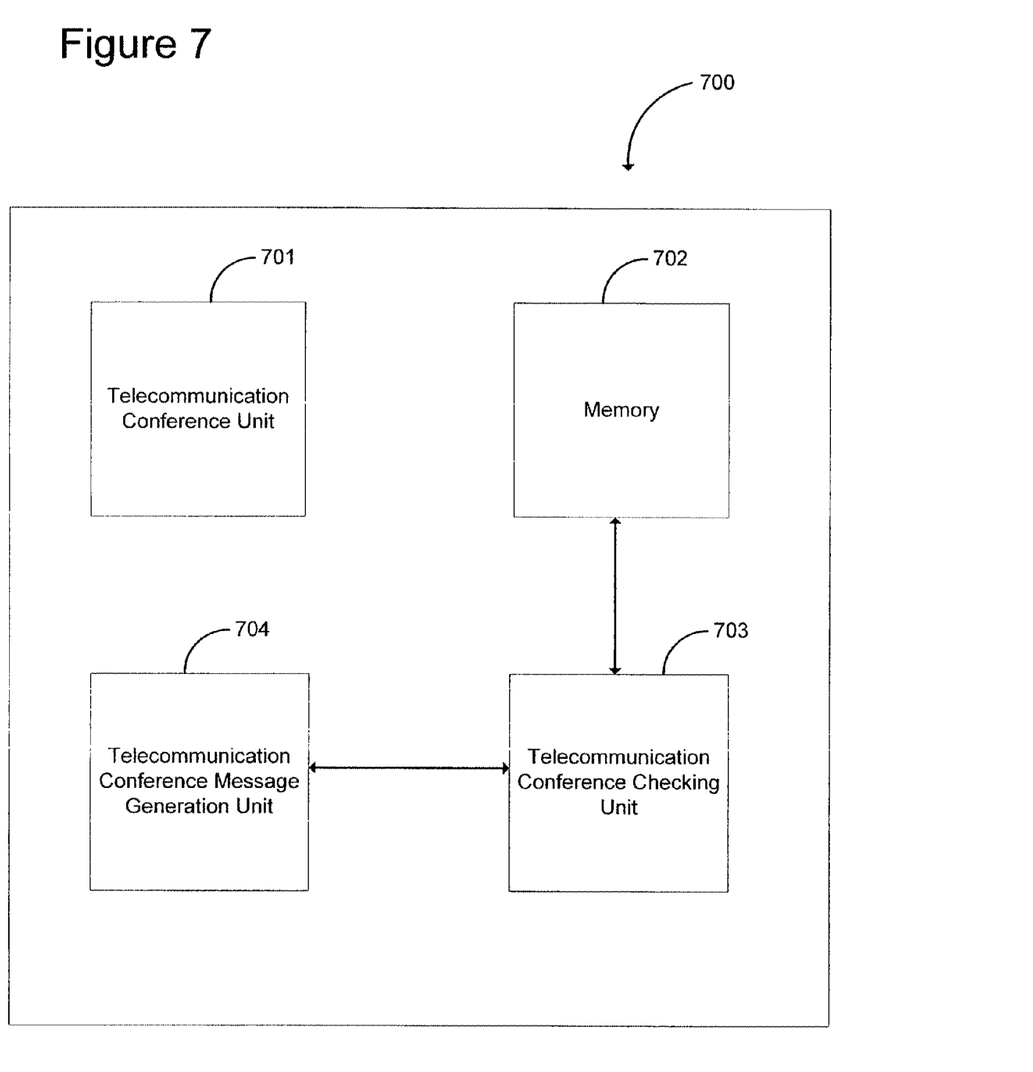
FIG. 7 is a block diagram of an image-capturing device according to a fourth embodiment.

FIG. 7 shows the structure of an image-capturing device according to the fourth embodiment. The structure of the image-capturing device shown in FIG. 7 is different from that shown in FIG. 1 in that the image-capturing device shown in FIG. 7 includes an image-rotating circuit 22 instead of the image-signal generating circuit 4. The image-rotating circuit 22 rotates a detected face region.

The fourth embodiment is different from the second embodiment in that the accuracy of face detection is increased by detecting a face region from image signals of an image obtained by the image-rotating circuit 22 rotating an image that is shot under predetermined exposure conditions in the fourth embodiment. The AGC 2 and AD converter 14 can be considered to be an image-conversion unit that converts an output signal from an image sensing device (CCD 1) to a first image signal, with the image-rotating circuit 22 generating a second image signal, wherein a rotation angle of the first image signal is different to the rotation angle of the second image signal.

Figure 8:
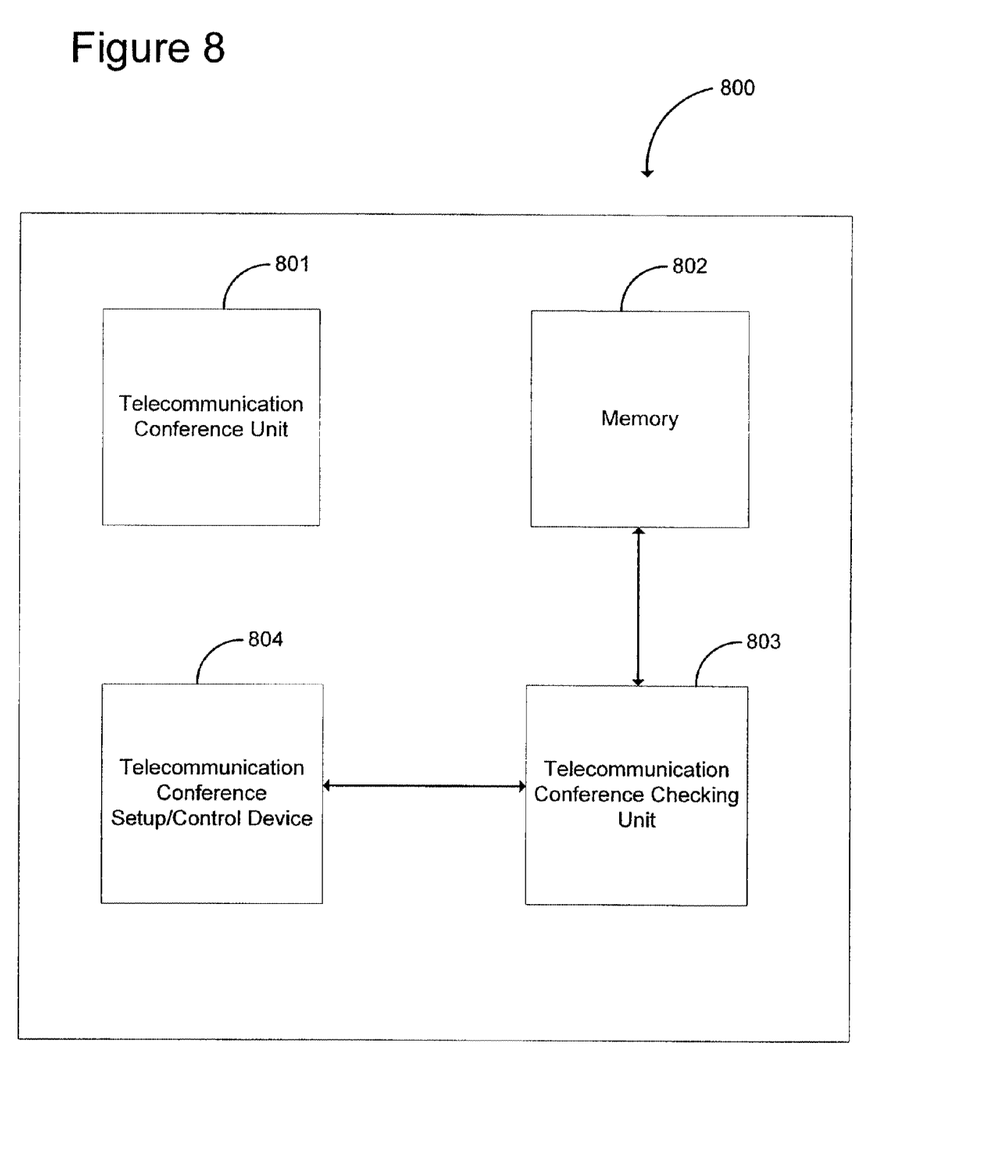
FIG. 8 is a flowchart showing the process according to the fourth embodiment.

The process flow through steps S101 to S103 and the process flow through steps S107 to S114 in FIG. 8 are the same as those in FIG. 2, and other process flows are unique to FIG. 8. The other process flows will be described.

When the first image signals are obtained in step S103, face-region detection is performed on the first image signals in step S141 as in step S106 in FIG. 2.

When a face region is detected in step S141, the process proceeds to step S107.

When a face region is not detected or the reliability of the detected face region is less than a predetermined threshold value in step S141, the process proceeds to step S142.

In step S142, the image-rotating circuit 22 generates second and third images by rotating the first image by +45° and −45°, respectively.

In step S143, face-region detection is performed on image signals of the second and third images generated in step S142.

When a face region is detected in step S143, the process proceeds to step S107.

When a face region is not detected or the reliability of the detected face region is less than the predetermined threshold value in step S143, the process proceeds to step S144.

In step S144, the CPU 18 outputs a message that face-region detection failed, the AE-control circuit 19 performs regular evaluative light metering on the image signals of the image before rotation as in step S115 in FIG. 2, and then the process proceeds to step S145. In step S145, Av, Tv, and Sv for actual shooting are determined, and the process proceeds to step S111.

The process of rotating an image by the image-rotating circuit 22 in step S142 will now be described.

In this embodiment, bandpass filtering is performed in the vertical and horizontal directions to detect main parts of a face, for example, eyes, a nose, a mouth, and ears. Thus, for example, when an image subjected to face-region detection is inclined at an angle of 45°, the accuracy of face-region detection decreases. In view of this situation, bandpass filtering is performed in the direction inclined at an angle of 45° corresponding to the inclination of the image subjected to face-region detection, and thus face-region detection can be performed regardless of the inclination of an image.

Although three images having respective inclinations of +45°, 0°, and −45° are used in this embodiment, the number of images and respective inclinations of images may be freely changed.

Moreover, before the face-detecting block performs face detection on the first image, the image-rotating circuit 22 may generate the second and third images by rotating the first image. Then, face detection may be performed on these three images, and the respective results from the three images may be compared with each other. As in the first embodiment, when a face region is detected from a plurality of images, the CPU 18 may set a light metering frame and a focusing frame on a face region in which the reliability of the results of face-region detection is highest.

In the embodiments described above, the face of a person is detected. Alternatively, other parts of a person may be detected. Moreover, an object other than a person may be detected. An animal, a plant, a vehicle, a building, and the like may be detected so long as the object can be identified in an image by its shape.

The present invention may be implemented by providing to a system or an apparatus a recording medium (or a storage medium) storing program codes of a software program that performs the functions according to the embodiments described above and by causing a computer (a CPU or an MPU) included in the system or in the apparatus to read out and execute the program codes stored in the recording medium. In this case, the program codes read from the recording medium perform the functions according to the embodiments described above, and thus the present invention includes the recording medium storing the program codes.

Moreover, other than the case where the program codes are read out and executed by a computer to perform the functions according to the embodiments described above, it is apparent that the present invention also includes a case where, for example, an operating system (OS) operating on a computer executes some or all of the actual processing to perform the functions according to the embodiments described above, based on instructions from the program codes.

Moreover, it is apparent that the present invention also includes a case where the program codes read out from the recording medium are written to a memory included in, for example, a function expansion card inserted in a computer or a function expansion unit connected to a computer, and then, for example, a CPU included in the function expansion card, the function expansion unit, or the like executes some or all of the actual processing to perform the functions according to the embodiments described above, based on instructions from the program codes.

When the present invention is applied to the recording medium, the recording medium stores program codes corresponding to the flowcharts described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-287653 filed Sep. 30, 2004, which is hereby incorporated by reference herein in its entirety.

What is claimed is:

1. An image-processing device having a function that performs detection processing on a first image signal to detect a specific target region of a subject, the device comprising:
   an image-signal generating device that generates a second image signal by digitally amplifying the first image signal, the second image signal being different from the first image signal in terms of luminance level;
   a target-region detecting device that performs detection processing on the first and second image signals to detect the specific target region of the subject; and
   a control unit that compares the results of detecting the target region from the first image signal with the results of detecting the target region from the second image signal, and automatically selects the results of detecting the target region from either the first or second image signal depending on respective detected area sizes,
   wherein the control unit performs at least one of automatic exposure control and automatic focusing control by setting at least one of a light metering frame and a focusing frame according to the automatically selected results of detecting the target region.

2. The image-processing device according to claim 1, further comprising an image-conversion unit that converts an output signal from an image-sensing device to the first image signal.

3. The image-processing device according to claim 1, wherein a luminance level of the first image signal is less than an appropriate luminance level set in the image-processing device.

4. The image-processing device according to claim 1, wherein a resolution of the first image signal is different than a resolution of the second image signal.

5. The image-processing device according to claim 1, wherein a rotation angle of the first image signal is different than a rotation angle of the second image signal.

6. The image-processing device according to claim 1, wherein the image-signal generating device generates the second image signal that is different from the first image signal from the first exposure in the case that the target-region detecting device fails to detect the target region from the first image signal.

7. The image-processing device according to claim 1, wherein the target region is a face region of the subject.

8. A method for controlling an image-processing device having a function that performs detection processing on a first image signal to detect a specific target region of a subject, the method comprising:
- an image-signal generating step of generating a second image signal by digitally amplifying the first image signal, the second image signal being different from the first image signal in terms of luminance level;
- a target-region detecting step of performing detection processing on the first and second image signals to detect the specific target region of the subject; and
- a control step of comparing the results of detecting the target region from the first image signal with the results of detecting the target region from the second image signal, and automatically selecting the results of detecting the target region from either the first or second image signal depending on respective detected area sizes, and performing at least one of automatic exposure control and automatic focusing control by setting at least one of a light metering frame and a focusing frame according to the automatically selected results of detecting the target region.

9. A non-transitory computer-readable medium that stores a program that causes a computer to execute the method according to claim 8.

10. An image-capturing device comprising:
- an image-signal generating device that generates different first and second image signals from an output signal corresponding to a first exposure from an image-sensing device, the second image signal being generated by digitally amplifying the first image signal, and the second image signal being different from the first image signal in terms of luminance level;
- a target-region detecting device that performs detection processing on the different image signals to detect a specific target region of a subject; and
- a control unit that compares the results of detecting the target region from the first image signal with the results of detecting the target region from the second image signal, and automatically selects the results of detecting the target region from either the first or second image signal depending on respective detected area sizes,
- wherein the control unit performs at least one of automatic exposure control and automatic focusing control by setting at least one of a light metering frame and a focusing frame according to the automatically selected results of detecting the target region.

11. The image-processing device according to claim 1, wherein the control unit controls parameters for image capture according to the selected results of detecting the target region.

12. The image-processing device according to claim 1, wherein the control unit is configured to automatically select the results of detecting the target region that is largest from either the first or second image signal.

* * * * *